Aug. 23, 1938.  R. D. PIKE  2,127,937
MAKING BEARINGS
Filed April 17, 1935   3 Sheets-Sheet 1
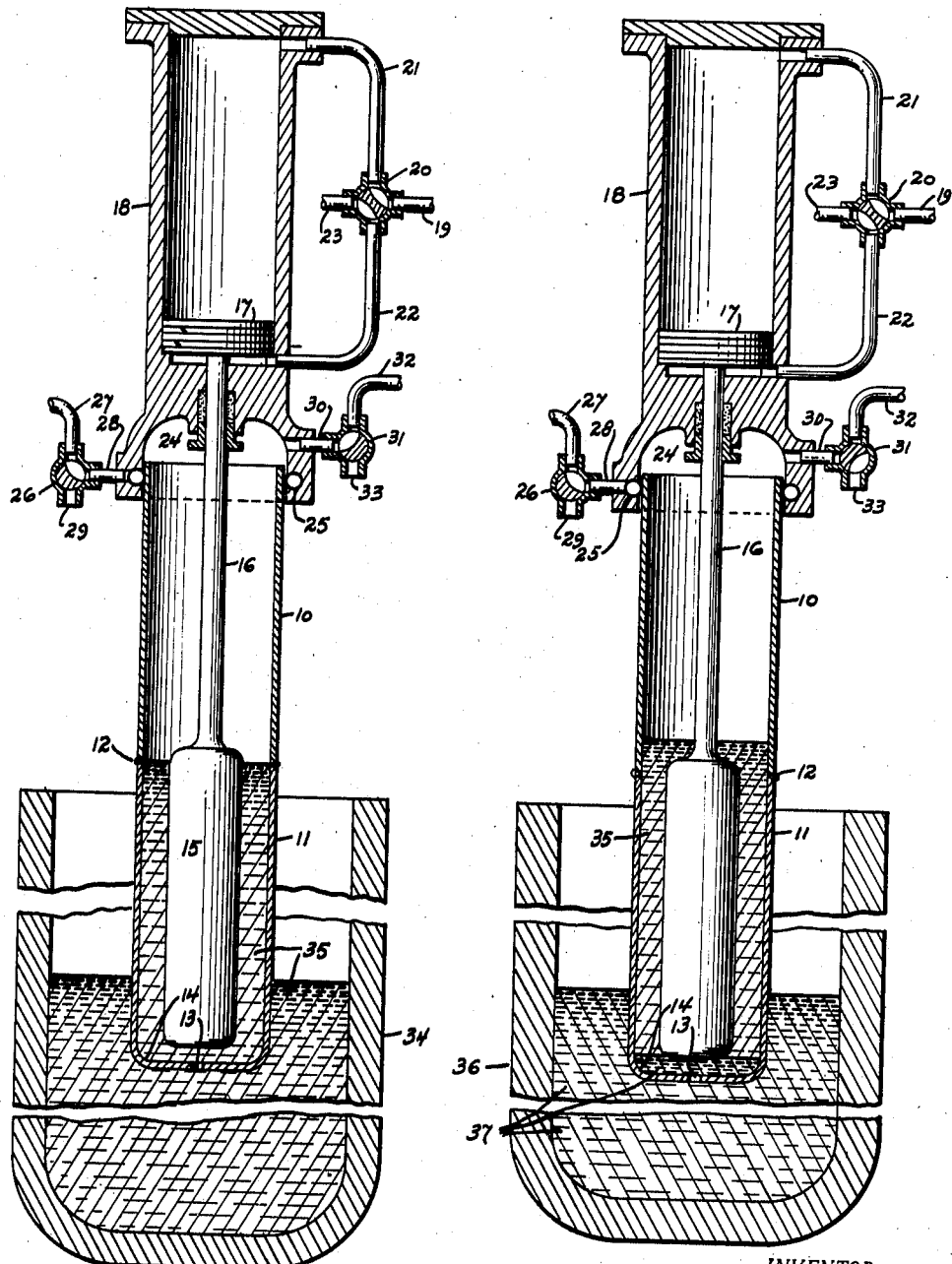
INVENTOR.
Robert D. Pike.
BY
Chas. E. Townsend.
ATTORNEY Aug. 23, 1938.  R. D. PIKE  2,127,937
MAKING BEARINGS
Filed April 17, 1935   3 Sheets-Sheet 2
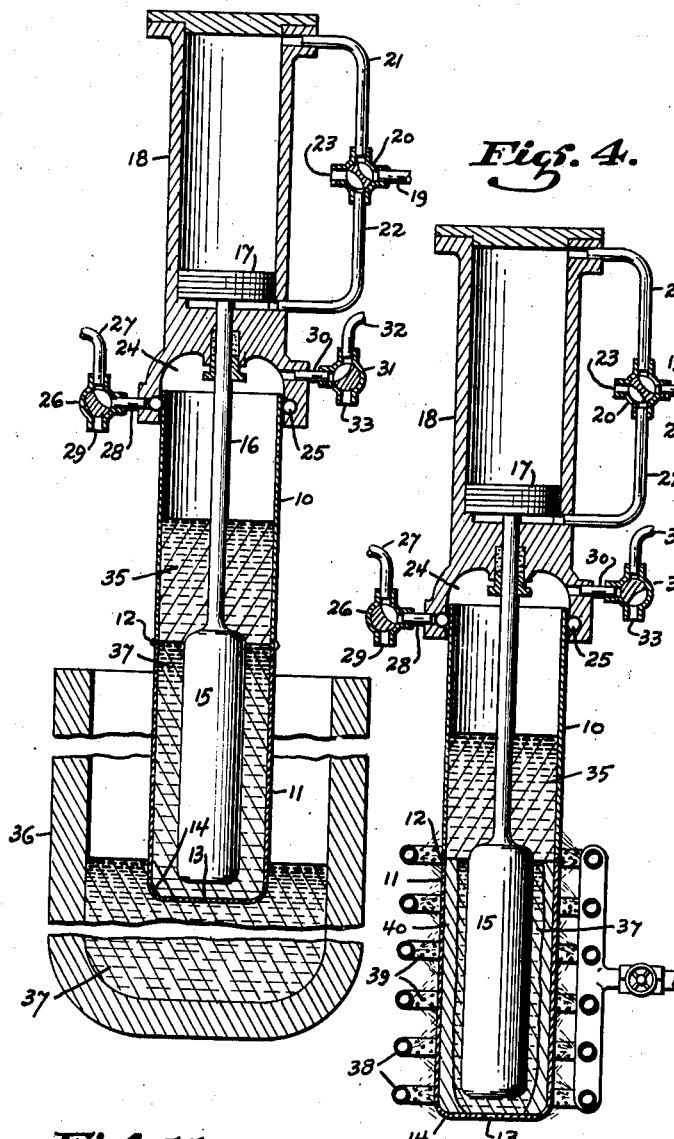
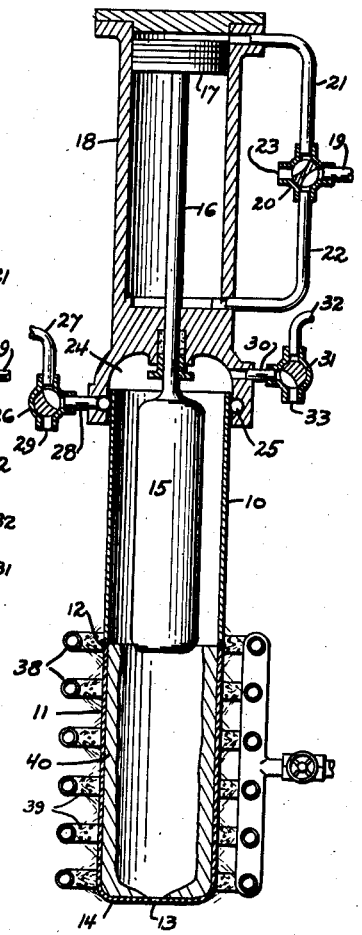
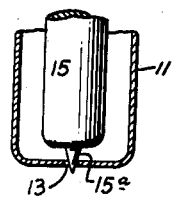
INVENTOR.
Robert D. Pike
BY
Chas. E. Townsend
ATTORNEY Aug. 23, 1938. R. D. PIKE 2,127,937
MAKING BEARINGS
Filed April 17, 1935 3 Sheets-Sheet 3
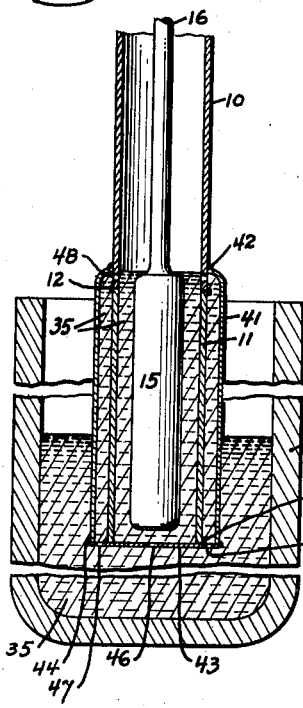
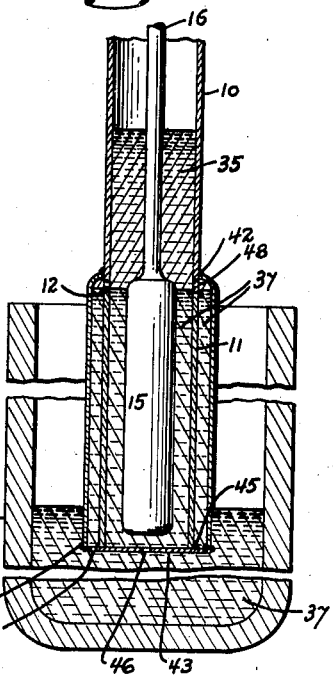
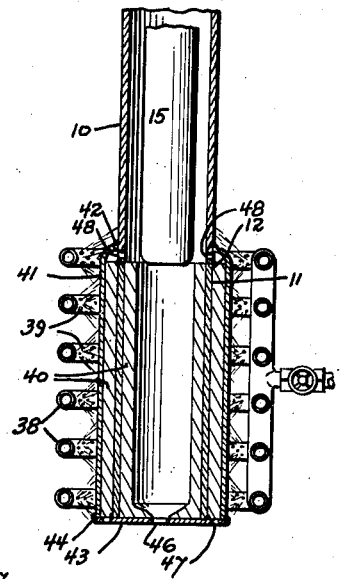
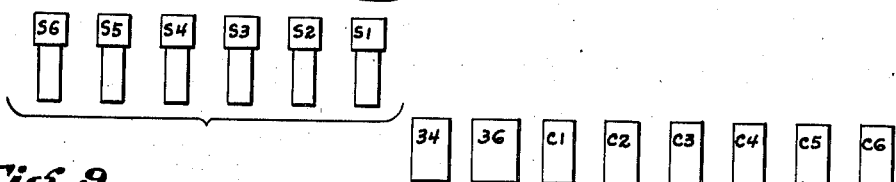
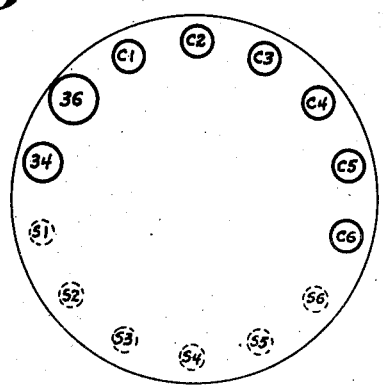
INVENTOR.
Robert D. Pike.
BY
Chas. E. Townsend.
ATTORNEY Patented Aug. 23, 1938

2,127,937

UNITED STATES PATENT OFFICE 2,127,937

MAKING BEARINGS

Robert D. Pike, Piedmont, Calif., assignor to Kalif Corporation, Emeryville, Calif., a corporation of Delaware Application April 17, 1935, Serial No. 16,818

7 Claims. (Cl. 22—203)

In certain former applications, for example, my applications Serial No. 554,785, filed August 3, 1931, for "Compound article and method of making the same", Serial No. 709,713, filed February 5, 1934, for "Making bearings", and Serial No. 754,757, filed November 26, 1934, for "Making bearings", I have described processes of welding plastic bronzes directly, autogenously, firmly, uniformly and integrally to iron or steel backing members, the resulting product being used in the manufacture of bearings having a plastic bronze bearing facing welded to an iron or steel supporting backing member.

As is well known, plastic bronzes present a bearing facing which has very desirable bearing characteristics, and the essential constituents thereof are, as a rule, copper or an alloy high in copper, together with lead, the lead content running in practice anywhere from 15% to 20%, or less, up to 40% or 45%, or higher. Metals in addition to copper and lead are frequently present, generally for the purpose of forming a copper alloy and, as a matter of practice, these are generally present in amounts running from a fraction of 1% perhaps up to 5% more or less, the additional metals usually being tin or nickel, although others may be used.

In the applications above referred to and of which this application is a continuation in part as to common subject matter, the plastic bronze is cast in molten condition against the solid backing member. To obtain the above described type of weld, it is necessary that the interface between the steel and bronze be not below a certain temperature; and it is also desirable that the steel be not too hot and that the plastic bronze be not too hot. According to the above mentioned applications the desired working conditions can be attained by superheating the flux to about 2550° F. to 2750° F., say about 2650° F. The steel backing is generally heated to somewhere between 1450° F. and 1750° F., say about 1700° F.; while the plastic bronze is maintained at about 2000° F. to 2200° F., say about 2100° F. The bronze is somewhat above its melting point to prevent freezing thereof during the casting steps; and the backing is at, or a little below, or it may be even a little above the melting point of the bronze.

The superheated flux is contacted with the backing member not only to clean it but to impart heat to the face thereof and prepare it to receive the bronze so that when the bronze contacts the backing, welding is almost instantaneous, particularly at the above stated preferred temperatures, as a result of which the surface of the steel is made very hot by the flux for only a short period of time, that is, until the bronze contacts it. Welding being practically instantaneous, there is no harm in this being followed by practically immediate cooling.

The flux, as stated in my prior applications, is of the borax type and may consist of—

| | Per cent |
|---|---|
| Anhydrous borax | 80 |
| Cryolite | 10 |
| Boric acid | 10 | this having a melting point around 1100° F., so that at 2550° F. to 2750° F. it is not only very fluid, but chemically very active.

After casting and at suitable points in the cooling interval thereafter, the set-ups are cooled rapidly as by quenching.

An object of the present invention is to minimize the amount of flux and/or molten plastic bronze.

Another object of the invention is to make it possible to begin quenching while the core is still in casting position.

Another object of the invention is to increase the rapidity of quenching.

Another object of the invention is to decrease or eliminate the interval between casting and quenching.

Other objects of the invention will be apparent from the following disclosure.

Referring to the drawings which form a part of this specification—

Fig. 1 is a sectional view illustrating one step in my invention, that is, with the set-up in the flux bath and the flux drawn up into contact with the backing member;

Fig. 2 is a similar view, illustrating a later step with a set-up in the metal bath;

Fig. 3 is a similar view, with the set-up in the metal bath and metal drawn up to replace the flux;

Fig. 4 is a similar view, illustrating the set-up in chilling position;

Fig. 5 is a similar view, illustrating the chilled, cast-welded, bimetallic unit;

Fig. 6 is a view similar to Fig. 1, illustrating the welding of plastic bronze to both the inside and the outside of a steel sleeve;

Fig. 7 is a view similar to Fig. 3, illustrating a later step than Fig. 6;

Fig. 8 illustrates the chilled bimetallic unit comprising the steel sleeve having plastic bronze welded to both the inside and outside faces thereof;

Fig. 9 is a diagrammatic illustration of a merry-go-round-type of device useful in carrying out my process;

Fig. 10 is a development of Fig. 9, showing the relationship of the successive steps; and Fig. 11 is a diagrammatic illustration of a detail.

I provide a tube 10 made up of any type of metal which is heat-resistant and which is also resistant to plastic bronze, that is, to which the plastic bronze will preferably not adhere.

11 is the steel tube to the inside face of which the plastic bronze is to be welded and which thus will form the bearing back. The two tubes 10 and 11 are welded together at their meeting edges 12.

The bottom of the tube 11 is closed except for a small opening 13, and this may be accomplished by rolling in the bottom of the tube as at 14, or by an alternative method to be described later with respect to Figs. 6, 7 and 8.

I provide a core 15 which is heat-resistant and resistant to the molten bronze; that is, which will not be wet by the plastic bronze and to which it will not adhere, and it may be made of the same material as the tube 10, or of any other suitable material. The core is carried by a piston rod 16 which, in turn, is attached to a piston 17 mounted within a cylinder 18, the piston being adapted to travel back and forth within the cylinder 18 as it is urged by fluid pressure from either above or below.

A pipe 19 from a source of compressed air (not shown) leads to the four-way valve 20, from which the pipes 21 and 22 connect one to each end of the cylinder, the fourth way of the valve being an exhaust vent 23. The adjustment of the valve is such that when the compressed air pipe is connected to either end of the cylinder, the other end of the cylinder is connected to the exhaust vent. The core 15 may thus be moved up or down and held in position by proper manipulation of the valve 20.

I provide a hollow chamber 24 below the cylinder, this being provided with a collapsible hollow copper gasket 25 into which fluid pressure may be admitted or released by a three-way valve 26, one way 27 of which connects with a source of compressed air (not shown), another way 28 of which connects with the gasket 25, and the third way 29 of which comprises an exhaust vent, the valve being so arranged that the gasket is connected either with a source of compressed air or with the exhaust, or the connection to the gasket is closed.

A pipe 30 connects the chamber 24 to a three-way valve 31, one way 32 of which is connected to a source of vacuum (not shown), and the third way 33 of which comprises an exhaust to atmosphere so that any degree of vacuum ranging from atmospheric pressure to that caused by the source of vacuum may be maintained within the chamber 24.

The tube 11, after being shaped, is welded at 12 to the tube 10, and the tube 10 is then inserted within the gasket 25 whereupon the gasket is inflated and maintained inflated by manipulation of the valve 26 to make a tight joint.

In performing the various welding steps, I may treat each set-up singly or in groups of any desired number, groups of six being what I prefer as a rule; and I will describe my process with relation to groups of six.

The set-ups in a group are moved to insert the tube 11 into a furnace (not shown) where they are heated to the temperature of the backing above referred to, preferably within the range of 1450° F. to 1750° F., 1700° F. being a suitable temperature; and the first set-up $S_1$ is then moved over the pot 34 containing the supermolten flux 35 (as shown on Fig. 1), the set-ups thus being moved one step to the right from their positions shown on Fig. 10, whereupon the valve 31 is operated to withdraw air from the chamber 24 and create a partial vacuum within the tube comprised of the tubes 10 and 11, this drawing flux up into the space between the core 15 and the tube 11, to about the top of the tube 11. The flux in the pot 34 is superheated as above described, that is, to a temperature of about the range of 2550° F. to 2750° F., 2650° F. being a suitable temperature. This superheated flux prepares the surface of the tube 11 of the first set-up $S_1$ almost immediately for welding.

This set-up $S_1$ is then lifted and moved and oriented in a similar manner over a pot 36 which contains molten plastic bronze 37, (as shown on Fig. 2), the series of set-ups now having been moved two steps to the right from the positions shown on Fig. 10. The plastic bronze 37 is at the temperature above referred to, namely, preferably within the range of 2000° F. to 2200° F., 2100° F. being a suitable temperature. With the first set-up $S_1$ over the pot 36 of metal, the second set-up $S_2$ is over the pot 34 of flux. These set-ups are then lowered into the respective pots in which they stand, the position of the second set-up $S_2$ being now shown in Fig. 1, while the position of the first-set-up $S_1$ is shown on Fig. 2, some metal entering the tube 11 and slightly raising the column of flux 35 thereover. Vacuum is then applied to both set-ups, whereupon flux enters the set-up $S_2$, as previously described with respect to the first set-up $S_1$, while metal is drawn into the first set-up $S_1$ to about the top of the tube 11, raising up the column of flux thereover as shown on Fig. 3. Welding of the plastic bronze to the tube 11 takes place practically instantaneously.

The first set-up $S_1$ is then oriented over a quenching means, the second set-up $S_2$ over the metal pot 36, and a third set-up $S_3$ over the flux pot 34, whereupon the second and third set-ups $S_2$ and $S_3$ undergo the treatment above described, while the first set-up $S_1$ is subjected to quenching in the position shown at $C_1$ on Figs. 9 and 10.

The quenching means comprises a set or series of coils 38 having perforations 39 to direct fluid centrally of the coils. A suitable cooling medium, such as water, steam, air, or atomized water in air is used to direct the cooling fluid upon the tube 11 within the coils, as shown on Fig. 4. Cooling is started as soon as, or almost as soon as, the tube 11 is positioned within the coil, as shown on Fig. 4. When the cooling starts, solidification of the bronze begins and progresses inwardly very rapidly toward the core. As soon as or slightly before solidification reaches the core 15, such core is rapidly raised by an upward movement of the piston 17, and cooling is continued after removal of the core, preferably until the set-up is cool enough to handle. On Fig. 4 I have illustrated the progression of solidification toward the core, 40 designating the solidified plastic bronze thereon, while the plastic bronze 37 is still molten; while on Fig. 5 all the plastic bronze 40 is cold and solid.

At the same time that the core is started on its upward movement, I release the vacuum by actuation of the valve 31, this permitting the molten flux and whatever bronze still remains molten within the set-up to flow out through the opening 13 into a suitable receptacle, from which it may be gathered up and re-used.

The step of quenching requires a longer interval of time than the preceding steps do, and it is therefore expedient to provide more than one quenching station in order to extend the duration of the quenching step. I find it expedient to provide one quenching station for each set-up in the group, that is, six quenching stations $C_1$, $C_2$, $C_3$, $C_4$, $C_5$, $C_6$, for a group of six set-ups.

I prefer to have the stations 34, 36, $C_1$, $C_2$, $C_3$, $C_4$, $C_5$, $C_6$ arranged along an arc of a circle so that the set-ups $S_1$, $S_2$, $S_3$, $S_4$, $S_5$, $S_6$ may be progressively moved to each succeeding station.

After the flux and remaining molten metal have been allowed to drain out of the set-up, the pressure on the gasket 25 is released by operation of the valve 26, the tubes 10 and 11 are withdrawn as a unit, and then cut apart at the weld 12. The tube 11 is then machined into bearings; and I prefer that this tube be long enough to cut a multiple number of bearings therefrom; for example, I have it from twelve to eighteen inches long when making bearings of usual automotive size so that a large number of such bearings may be cut therefrom.

On Figs. 6, 7 and 8, I illustrate the process of welding both inner and outer facings of plastic bronze to an iron or steel annulus. I use the same set-ups previously described with the addition of a skirt 41 of thin sheet metal, which may be steel, welded to the lower part of the tube 10 at 42, this skirt forming a tube around the tube 11. A disc 43 of similar metal is welded to the outer tube at 44 and to the inner tube 11 at 45, openings 46, 47 being provided to permit ingress of the flux and molten metal within the tube 11 and within the space between such tube and the outer tube 41. Openings 48 are provided in the tube 10 below the joint 42 to permit the vacuum to be effective within the space between the two tubes. On Fig. 6 the flux 35 is shown as filling the space between the two tubes as well as the space between the tube 11 and the core 15, the same having been drawn up by the vacuum in the manner previously described. After the set-up is removed from the flux pot to the metal pot, the metal is drawn up; whereupon the flux 35 assumes the position shown in Fig. 7, while the metal fills the spaces previously occupied by the flux. The removal of the core 15 is illustrated on Fig. 8 after solidification of the plastic bronze 40.

The steps of procedure are essentially the same in coating both the inner and outer faces of the annulus as previously described with respect to the inner face. Omission of the opening 46 on the devices of Figs. 6, 7 and 8 will result in coating only the outer face of the annulus.

I may weld a plate similar to the plate 43 to the bottom of the tube 11, as shown on Figs. 1 to 5, instead of shaping the bottom of the tube as shown on those figures; and, if desired, the tube 11 as used in the modification of Figs. 6, 7 and 8 may be shaped as shown on Figs. 1 to 5 instead of using the plate 43. In this event an annular band may be used to cover the annular space between the tubes 11 and 41 if this space is too wide to maintain the fluids therein properly.

The width of the openings 13 and 46 will have a critical value depending on various circumstances. It must be sufficiently small to hold the liquids within the tube and with this in view I may provide an added feature, as shown on Fig. 11; namely, a tapered plug 15a on the bottom of the core 15 which partly closes the opening 13 (or 46), the degree of closure depending on the relative height of the core and plug with respect to the opening.

Summarizing, I first prepare a group of, say, six set ups and mount them on merry-go-round supports. I then move the entire group into a furnace and when the requisite temperature has been reached, advance one set-up at a time progressively through the steps of filling with flux, filling with metal by vacuum lift, quenching, breaking vacuum, removing core upwardly, draining out surplus flux and bronze, removing set-up and cutting off the bearing stock.

After completion of cast-welding and cooling, the lower end of the set-up may be cut off and the bearing surface or surfaces machined smooth to the size desired, the outer tube 41 being likewise machined away.

By my above described process, I reduce to a very swift and rapid proceeding the manufacture of steel-backed, plastic bronze bearings, thus reducing their cost to a point where they may enter into general use in all automotive engines.

I have referred to various details by way of illustrating the invention and not as a limitation thereof; and various features may be changed without departing from the spirit of the invention the scope of which is defined in the appended claims.

Having described my invention, what I claim and desire to secure by Letters Patent of the United States is—

1. The method of making bearings by cast-welding plastic bronze onto an iron or steel tube by heating said tube then treating the surface thereof to be welded with a molten flux and then replacing said flux with said bronze in molten condition, the temperatures of said tube and said bronze being insufficient to cause the maximum firmness of weld, the flux being superheated to a temperature at which heat is imparted to the surface of the tube to be welded to produce the maximum firmness of weld; said method being characterized by forming a casting space between said tube and a movable object at about the same temperature as said tube, removing said object after solidification of the bronze in said casting space and before said solidification occurs at said object and draining out any remaining molten metal and flux.

2. The method of making bearings by cast-welding plastic bronze onto an iron or steel tube by heating said tube then treating the surface thereof to be welded with a molten flux and then replacing said flux with said bronze in molten condition, the temperatures of said tube and said bronze being insufficient to cause the maximum firmness of weld, the flux being superheated to a temperature at which heat is imparted to the surface of the tube to be welded to produce the maximum firmness of weld; said method being characterized by forming a casting space between said tube and a movable object at about the same temperature as said tube, chilling the plastic bronze in said casting space at said tube so that solidification of said bronze occurs progressively toward said object, then removing said object before solidification occurs thereat and draining out any remaining molten metal and flux.

3. The method of making bearings by cast-welding plastic bronze onto an iron or steel tube by heating said tube then treating the surface thereof to be welded with a molten flux and then replacing said flux with said bronze in molten condition, the temperatures of said tube and said bronze being insufficient to cause the maximum firmness of weld, the flux being superheated to a temperature at which heat is imparted to the surface of the tube to be welded to produce the maximum firmness of weld; said method being characterized by forming a casting space between said tube and a core resistant to said bronze and at about the same temperature as said tube, removing said core after solidification of said bronze in said casting space and before said solidification occurs immediately at said core and draining out any remaining molten metal and flux.

4. In the method of cast-welding plastic bronze to an iron or steel tube in which welding temperature is imparted by a superheated flux, the steps of inserting said tube with a core therein into said superheated flux, drawing said superheated flux into said tube and around said core, removing said assembly from said flux and inserting it into molten plastic bronze, drawing up bronze to replace said flux, removing said assembly from said bronze, rapidly chilling the outside of said assembly and removing said core from said tube and draining out any remaining molten metal and flux before solidification occurs thereat.

5. In the method of cast-welding plastic bronze to an iron or steel tube in which welding temperature is imparted by a superheated flux, the steps of inserting said tube with a core therein and a spaced skirt therearound into said superheated flux, drawing said superheated flux into said tube and around said core and into the space between said tube and said skirt, removing said assembly from said flux and inserting it into molten plastic bronze, drawing up bronze to replace said flux, removing said assembly from said bronze, rapidly chilling the outside of said assembly and removing said core from said tube and draining out any remaining molten metal and flux before solidification occurs thereat.

6. The method of making bearings by cast-welding a bearing metal onto a tubular metal backing member which comprises casting molten bearing metal into the tube around a movable core, chilling the cast metal from the exterior, and then removing the core just prior to solidification of the metal at its surface.

7. The method of making bearings by cast-welding a bearing metal onto a tubular metal backing member which comprises drawing flux into the tube from the lower end thereof, drawing molten bearing metal into the tube in the same manner to displace the flux and surround a movable core, and removing the core prior to the solidification of the cast metal adjacent its surface.

ROBERT D. PIKE.